United States Patent
Moudgill et al.

(10) Patent No.: US 8,539,188 B2
(45) Date of Patent: Sep. 17, 2013

(54) METHOD FOR ENABLING MULTI-PROCESSOR SYNCHRONIZATION

(75) Inventors: Mayan Moudgill, White Plains, NY (US); Vitaly Kalashnikov, Stamford, CT (US); Murugappan Senthilvelan, Carmel, NY (US); Umesh Srikantiah, Basking Ridge, NJ (US); Tak-po Li, Nesconset, NY (US); Pablo Balzola, Nanuet, NY (US)

(73) Assignee: QUALCOMM Incorporated, San Diego, CA (US)

( * ) Notice: Subject to any disclaimer, the term of this patent is extended or adjusted under 35 U.S.C. 154(b) by 650 days.

(21) Appl. No.: 12/362,329

(22) Filed: Jan. 29, 2009

(65) Prior Publication Data

US 2009/0193279 A1 Jul. 30, 2009

Related U.S. Application Data

(60) Provisional application No. 61/024,649, filed on Jan. 30, 2008.

(51) Int. Cl.
*G06F 12/14* (2006.01)

(52) U.S. Cl.
USPC ............. 711/167; 711/217; 711/E12.091

(58) Field of Classification Search
None
See application file for complete search history.

(56) References Cited

U.S. PATENT DOCUMENTS

| | | | |
|---|---|---|---|
| 6,842,848 B2 | 1/2005 | Hokenek et al. | |
| 6,904,511 B2 | 6/2005 | Hokenek et al. | |
| 6,912,623 B2 | 6/2005 | Hokenek et al. | |
| 6,925,643 B2 | 8/2005 | Hokenek et al. | |
| 6,968,445 B2 | 11/2005 | Hokenek et al. | |
| 6,971,103 B2 | 11/2005 | Hokenek et al. | |
| 6,990,557 B2 | 1/2006 | Hokenek et al. | |
| 7,251,737 B2 | 7/2007 | Weinberger et al. | |
| 7,428,567 B2 | 9/2008 | Schulte et al. | |
| 7,475,222 B2 | 1/2009 | Glossner et al. | |
| 7,593,978 B2 | 9/2009 | Schulte et al. | |
| 7,797,363 B2 | 9/2010 | Hokenek et al. | |
| 2005/0050374 A1* | 3/2005 | Nakamura et al. | 713/375 |
| 2005/0081204 A1* | 4/2005 | Schopp | 718/100 |
| 2006/0095729 A1 | 5/2006 | Hokenek et al. | |
| 2006/0282839 A1 | 12/2006 | Hankins et al. | |
| 2007/0067770 A1* | 3/2007 | Thomasson | 718/100 |

(Continued)

OTHER PUBLICATIONS

IPRP dated Aug. 12, 2010 in PCT/US09/032456.

(Continued)

*Primary Examiner* — Charles Rones
*Assistant Examiner* — Ryan Dare
(74) *Attorney, Agent, or Firm* — Knobbe Martens Olson & Bear LLP

(57) ABSTRACT

A method for providing at least one sequence of values to a plurality of processors is described. In the method, a sequence generator from one or more sequence generators is associated with a memory location. The sequence generator is configured to generate the at least one sequence of values. One or more read accesses of the memory location are enabled by a processor from the plurality of processors. In response to enabling the read access, the sequence generator is executed so that it returns a first value from the sequence of values to the processor. After executing the sequence generator, the sequence generator is advanced so that the next access generates a second value from the sequence of values. The second value is sequentially subsequent to the first value.

20 Claims, 7 Drawing Sheets

(56) References Cited

U.S. PATENT DOCUMENTS

| | | |
|---|---|---|
| 2009/0276432 A1 | 11/2009 | Hokenek et al. |
| 2010/0115527 A1 | 5/2010 | Kotlyar et al. |
| 2010/0122068 A1 | 5/2010 | Hokenek et al. |
| 2010/0199073 A1 | 8/2010 | Hokenek et al. |
| 2010/0199075 A1 | 8/2010 | Hokenek et al. |
| 2010/0241834 A1 | 9/2010 | Moudgill |
| 2010/0293210 A1 | 11/2010 | Sima et al. |
| 2010/0299319 A1 | 11/2010 | Parson et al. |

OTHER PUBLICATIONS

Notification of Transmittal of the International Search Report and The Written Opinion of the International Search Authority, or the Declaration, Mar. 13, 2009.

Glossner et al., Sep. 2004, Sandblaster Low-Power Multithreaded SDR Baseband Processor, Proceedings of the 3rd Workshop on Applications Specific Processors (WASP'04), Stockholm, Sweden, pp. 53-58.

Balzola et al., Sep. 26, 2001, Design alternatives for parallel saturating multioperand adders, Proceedings 2001 International Conference on Computer Design, pp. 172-177.

Balzola, Apr. 2003, Saturating arithmetic for digital signal processors, PhD Thesis, Lehigh University.

Glossner et al, 2000, Trends in compilable DSP architecture, IEEE Workshop in Signal Processing Systems, pp. 1-19.

Glossner et al., Apr. 2001, Towards a very high bandwidth wireless battery powered device, IEEE Computer Society Workshop in VLSI, pp. 3-9.

Glossner et al., Nov. 2002, A multithreaded processor architecture for SDR, The Proceedings of the Korean Institute of Communication Sciences, 19(11):70-84.

Glossner et al., Nov. 11-12, 2002, Multi-threaded processor for software-defined radio, Proceedings of the 2002 Software Defined Radio Technical Conference, vol. 1, 6 pp.

Glossner et al., Jan. 2003, A software defined communications baseband design, IEEE Communications Magazine, 41(1):120-128.

Glossner et al., Sep. 22, 23, 2003, Multiple communication protocols for software defined radio, IEEE Colloquium on DSP Enable Radio, ISIL, Livingston, Scotland, pp. 227-236.

Glossner et al., Mar. 4, 2004, 6. The Sandbridge sandblaster communications processor, Software Defined Radio: Baseband Technologies for 3G Handsets and Basestations, John Wiley & Sons, Ltd., pp. 129-159.

Jinturkar et al., Mar. 31-Apr. 3, 2003, Programming the Sandbridge multithreaded processor, Proceedings of the 2003 Global Signal Processing Expo (GSPx) and International Signal Processing Conference (ISPC), Dallas, TX.

Schulte et al., Nov. 19, 2000, Parallel saturating multioperand adders, Cases '00, pp. 172-179.

Schulte et al., Nov. 2004, A low-power multithreaded processor for baseband communication systems, Lecture Notes in Computer Science, 3133:393-402.

\* cited by examiner

METHOD FOR ENABLING MULTI-PROCESSOR SYNCHRONIZATION

CROSS-REFERENCE TO RELATED APPLICATIONS

This is a United States Non-Provisional Patent Application that relies for priority on and claims priority to U.S. Provisional Patent Application Ser. No. 61/024,649, filed on Jan. 30, 2008, the contents of which are incorporated herein by reference.

FIELD OF THE INVENTION

This invention relates to methods for processing signals in a multiprocessor environment. In particular, this invention concerns one or more methods to enable multi-processor synchronization.

DESCRIPTION OF THE RELATED ART

In any environment where multiple processes are active at any time, there is a need for a processing method that implements critical sections of the data processing. Typically, this is accomplished using some form of a mutual exclusion algorithm (otherwise referred to as a "mutex").

Mutexes may be implemented in a variety of different ways. In one known example, software algorithms are employed to implement the one or mutexes required for a particular processing environment. One example of a software algorithm is the Lamport's bakery algorithm.

As may be appreciated by those skilled in the art, software algorithms that implement mutexes may be quite slow. This is at least a first failing in the prior art.

As an alternative solution to software, hardware solutions are also known in the art. Most modern processors provide atomic instructions, such as compare-and-swap instructions or load-reserved/store-conditional instructions. These instructions allow for efficient implementation of synchronization of operations including those associated with mutexes.

As also may be appreciated by those skilled in the art, the implementation of these constructs on a multi-processor system may require a large amount of additional hardware. This is at least a second failing in the prior art.

Other failings in the prior art also exist, as should be apparent to those skilled in the art.

SUMMARY OF THE INVENTION

It is, therefore, one aspect of the invention to address at least one of the failings in the prior art.

To this end, the invention provides for a method, employed via software, to implement one or more mutexes without a significant degradation of processing speed.

The invention provides at least one method that incorporates a synchronization counter to enhance implementation of one or more mutexes without impeding processing speed, at least not to the same degree as software known in the prior art.

Among others, the method of the invention improves upon methods known in the prior art in several identifiable ways.

In one example, the method of the invention does not affect the processor. As a result, the method of the invention may be applied to any of a wide variety of different processors.

At least for this same reason, the method of the invention may be applied to processors that are a part of a multi-processor system.

Given that the method of the invention does not affect the processor, the invention also may be applied in processing environments where several different kinds of processors are utilized.

In the method of the invention, the synchronization counters are loaded from memory addresses. As a result, an implementation potentially may have as many counters as there are memory addresses. In other words, the number of synchronization counters is potentially un-bounded.

With this approach, the method of the invention allows mutexes potentially to be implemented with only one long-latency remote load operation. This remote load operation encompasses the initial read of the synchronization counter. The remainder of the operations may be either one or more remote store operations or one or more local read operations.

Other aspects of the invention will be made apparent from the description that follows and the drawings appended hereto.

BRIEF DESCRIPTION OF THE DRAWINGS

The invention will now be described in connection with one or more embodiments, aspects of which are illustrated in the drawings in which.

DESCRIPTION OF PREFERRED EMBODIMENT(S) OF THE INVENTION

Figure 1:
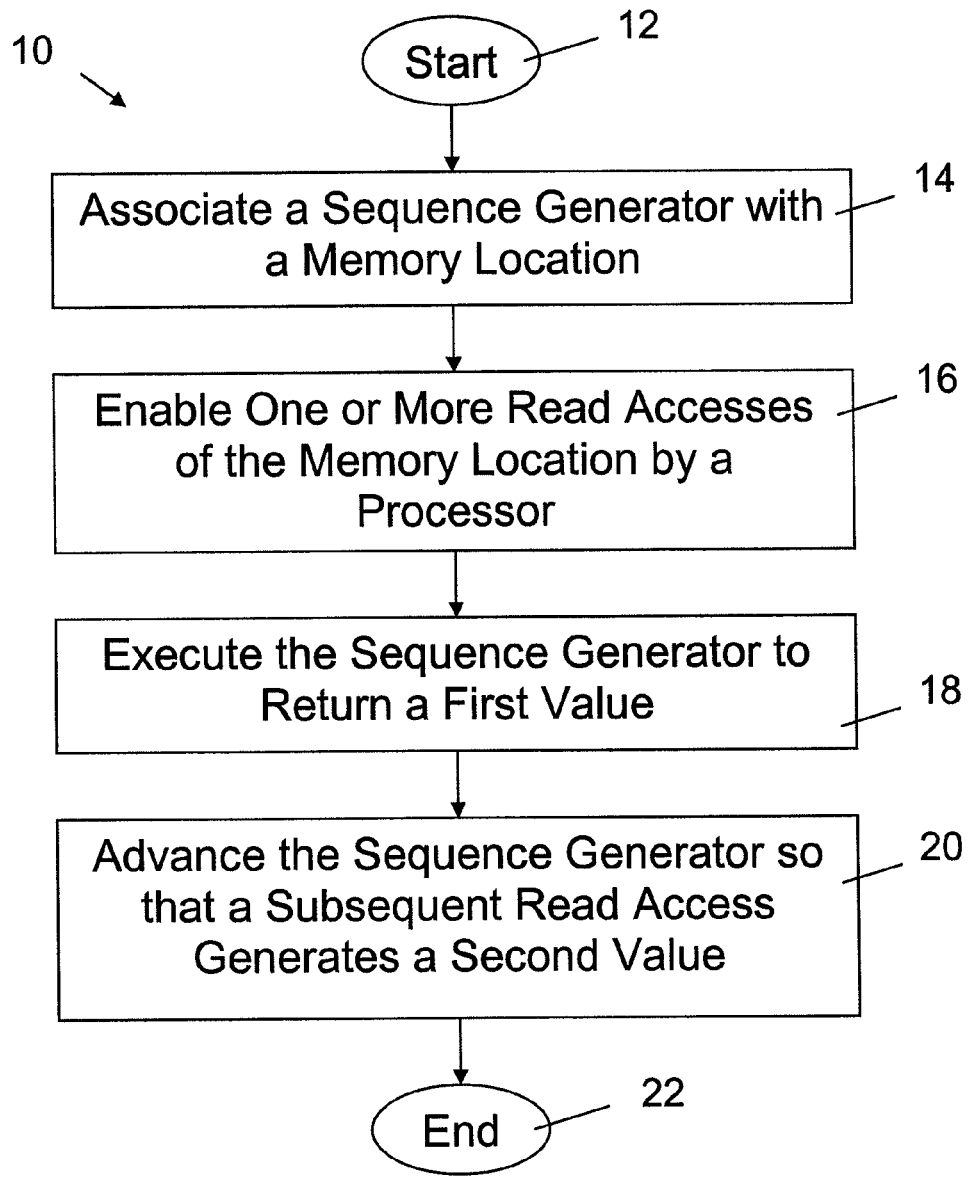
FIG. 1 is a flow chart illustrating a first embodiment of the method of the invention.

The invention will now be described in connection with one or more embodiments. It is intended for the embodiments and any associated examples and variations to be exemplary only. The invention is intended to encompass any equivalents and variations of the embodiments described herein, as should be appreciated by those skilled in the art.

As noted above, the method of the invention employs one or more synchronization counters. Each synchronization counter is implemented in association with a memory location where a successively higher value is returned every time that the memory location is read (or is accessed). Using such a synchronization counter, a mutex may be implemented as set forth below in Code Segment #1:

---

Code Segment #1

```
volatile int turn; /* turn is a global variable */
/* entering mutex */
int my_turn = read_synch_counter( );
while( my_turn != turn ) {
  /* wait */
}
... /* do stuff in the critical section */
turn++;
```

In a simple example of this approach, the value of "turn" is 0 and the first value returned by the counter also is 0. When the first process tries to access (or enter) the critical section of code, the value "my_turn" is set to 0, which is the same value as "turn". Since my_turn=turn, the process is allowed to enter the critical section of code. It is noted that my_turn refers to the number of the thread, while turn refers to the thread being executed.

It is possible that a subsequent processing iteration may try to access (or enter) the critical section of code before the first process exits the critical section of code. In this instance, the my_turn variable associated with the subsequent process will be assigned a value of 1. Since my_turn=1, the subsequent process will be required to wait until the first process exits the critical section of code.

At some point after the first process (my_turn=0) exits the critical section of code, the synchronization counter will increment to 1. As a result, turn will be incremented to 1. Once it is recognized that turn is the same as my_turn, the subsequent process (my_turn=1) will be permitted to access the critical section of code.

Having provided a general overview of the invention, the following discussion addresses a situation where multiple synchronization counters are provided.

With multiple synchronization counters, it is possible to implement multiple, disjointed mutexes at the same time. Each of the multiple synchronization counters are mapped onto different memory locations so that reading (or accessing) a word from one of those locations returns the value then existing in a counter. Successive reads of the same memory location return successively greater values for the synchronization counter.

For implementation of the invention, it is contemplated that each of the memory locations for each of the synchronization counters are visible to and accessible by all of the processors.

Before addressing other aspects of the invention, it is contemplated that a store (or a write operation) to a synchronization counter may be used to initialize the value.

Next, the applicability of the invention to a Non-Uniform Memory Access ("NUMA") multi-processor is described.

One contemplated NUMA processor for which the invention is suited is the sb3500, for example. In a NUMA processor, it is desirable for all repeated memory accesses (or reads) to be as local as possible. This minimizes processing time, among other things.

To implement the invention in the context of the mutex algorithm discussed above, the variable "turn" may be employed as a global variable. If this approach is employed, however, it is expected that some of the processors will be disadvantaged. Specifically, those processors that are not local to the stored variable will require additional processing time because it will take longer to access the memory location associated with that variable. As such, implementation of a single turn variable for all of the processors in a multiple processor environment is unnecessarily expensive (at least in terms of processing time) for a subset of all of the processors.

In the invention, to avoid disparate expense for different processors, the turn variable is replicated in a plurality of memory locations, each of which is more readily (and, therefore, more inexpensively) accessed by each of the different processors. It is contemplated that the turn variable will be replicated at the "cheapest" practical level for each of the processors. In one example, if there are N processors, the invention contemplates the replication of N turns, one for each processor.

In the example where there are N processors and N "turns", the invention may be implemented as set forth in Code Segment 2, below:

---
Code Segment #2
---

```
/* entering mutex
 * sync_addr is address of synch counter for this location
 * turn_addr[0..N-1] are the addresses of N variables
 */
int my_turn = *sync_addr; /* i.e. read_sync_counter( ) */
volatile int* this_turn = turn_addr[this_core( )];
while( my_turn != *this_turn ) {
    /* wait */
}
... /* do stuff in the critical section */
for(i=0; i<N; i++ ) {
    while(* turn_addr[i] != my_turn ) {
        /* wait */
    }
    *turn_addr[i] = my_turn+1;
}
```

As outlined in Code Segment #2, there is a "wait" instruction. The wait instruction is included in Code Segment #2 specifically to make sure that that turn[i] is not updated in a non-sequential fashion. It is possible that turn[i] may be first updated to N+2 and then updated to N+1 because of a reordering of write operations (or stores). Clearly, this is inconsistent with the approach of the invention, which provides for a sequential increase in the value of turn[i] from 0 . . . N−1.

Alternatively, the wait operation may be avoided. It is contemplated to design a process where reordering of the write operations (or stores) is prevented or avoided altogether.

For the method of the invention, it is contemplated that the turn variables and the synchronization counters will have the same bit width. When the same bit width is used, implementation of the method of the invention is greatly facilitated. As should be appreciated by those skilled in the art, in a binary system, because of the finite length of words, the synchronization counter will eventually "roll-over", i.e., transition from a non-zero bit pattern (i.e., generally all 1s) to an all-zero bit pattern (including only 0s). To facilitate implementation of the method of the invention, the turn variable relies on the same bit width so that the turn variable will "roll over" at the same time (or in the same iteration) as the synchronization counter. This avoids instances where the synchronization counter and the turn variable do not have the same bit width during any given iteration.

As noted above, there are several desirable results that may be obtained when the processing method of the invention is employed.

Figure 2:
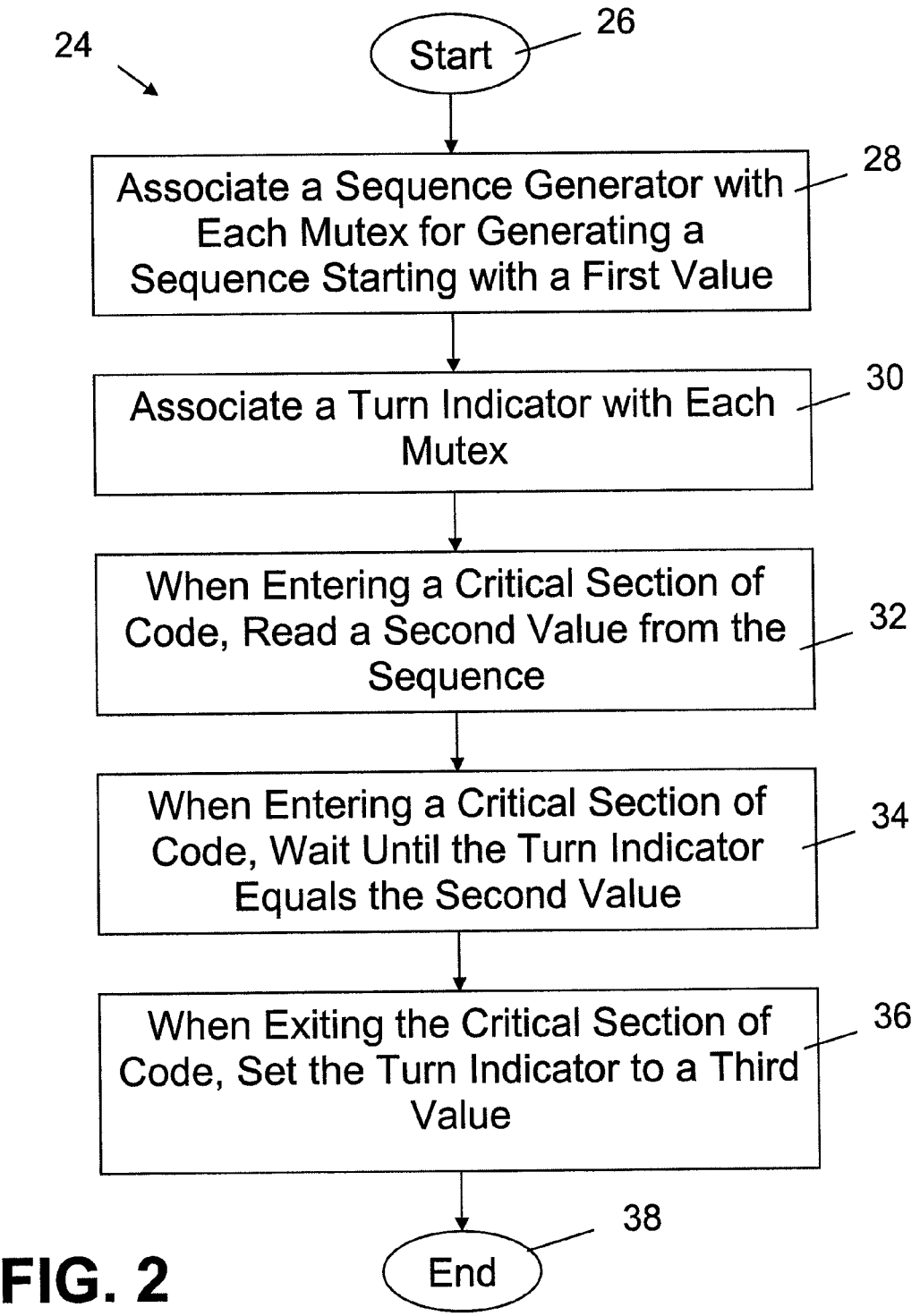
FIG. 2 is a flow chart illustrating a second embodiment of the method of the invention.
Figure 3:
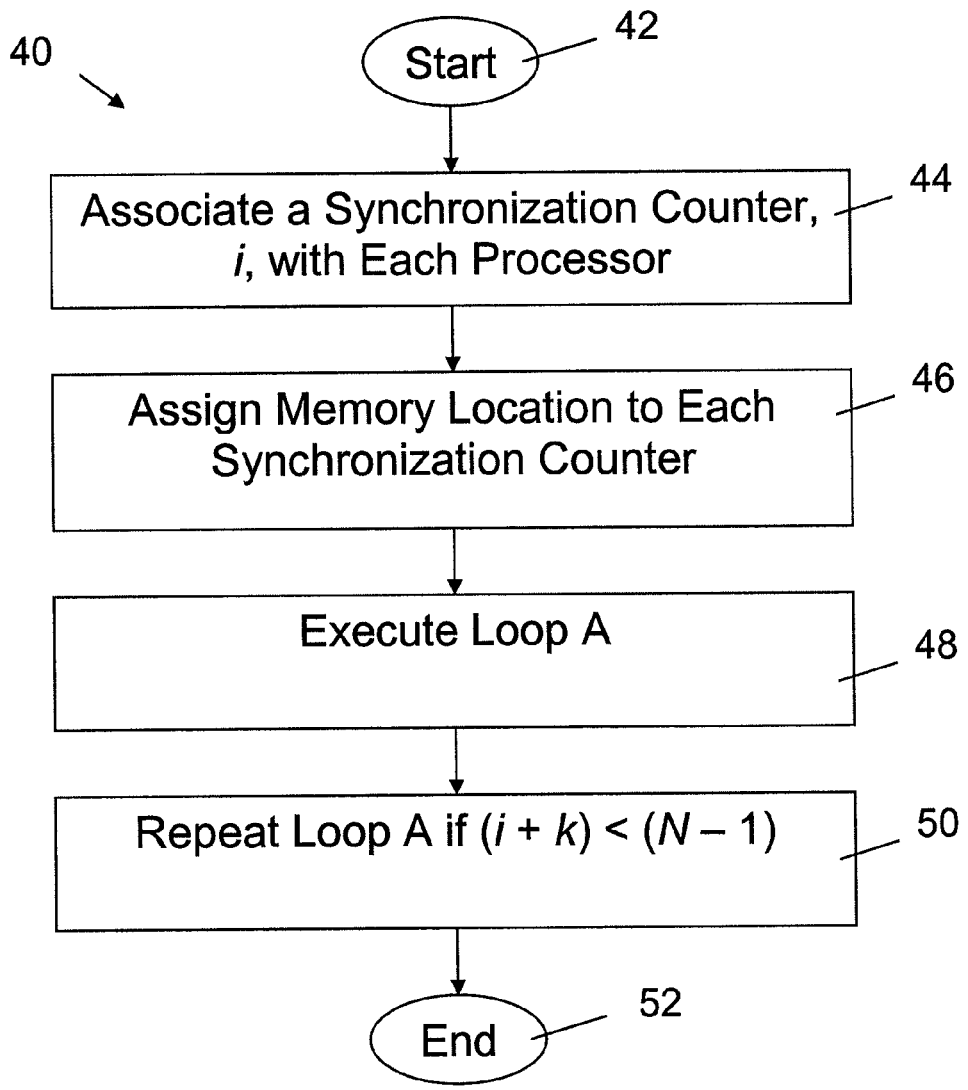
FIG. 3 is a flow chart illustrating a third embodiment of the method of the invention.
Figure 4:
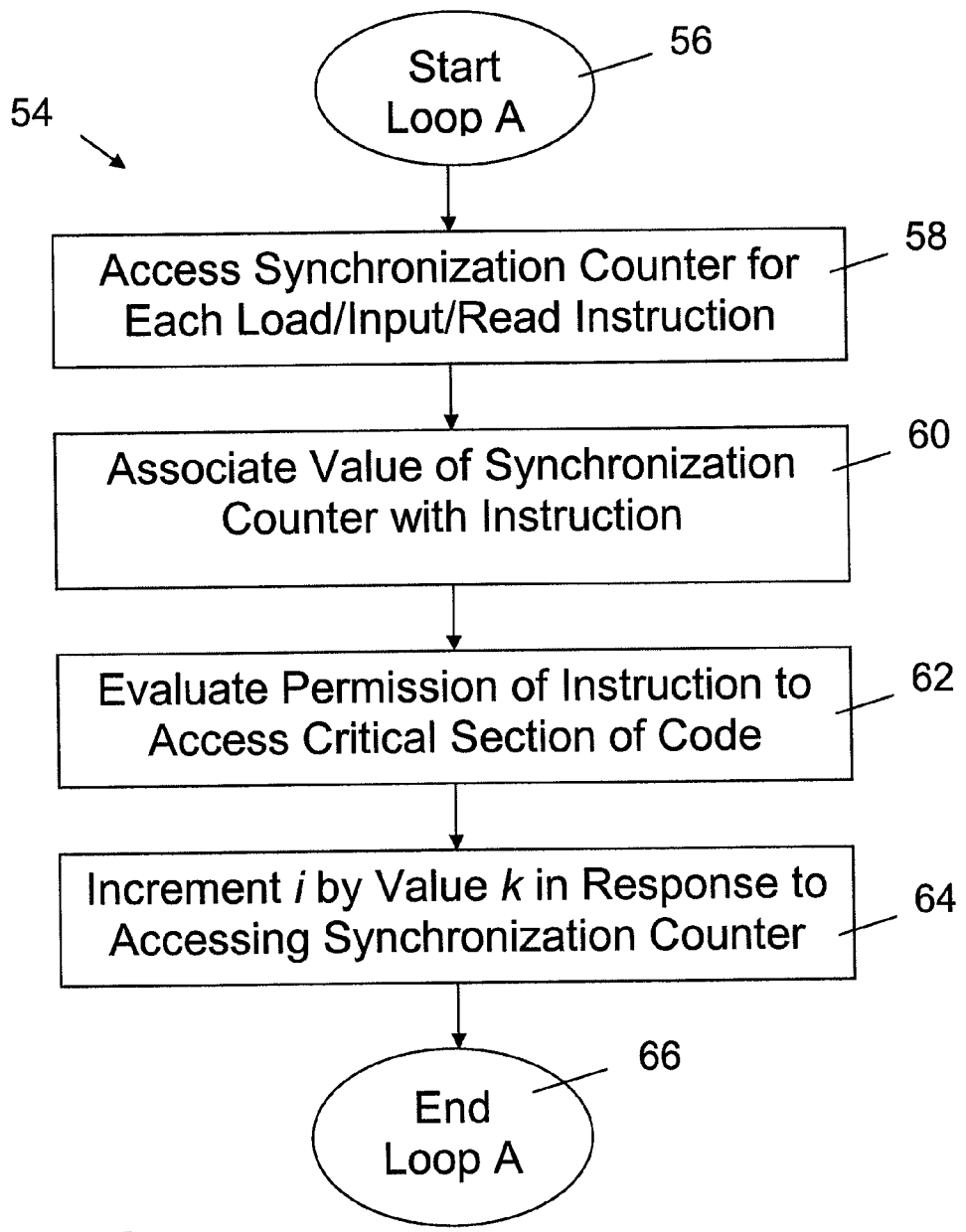
FIG. 4 is a flow chart illustrating loop A, which is a part of the third embodiment of the method illustrated in FIG. 3.
Figure 5:
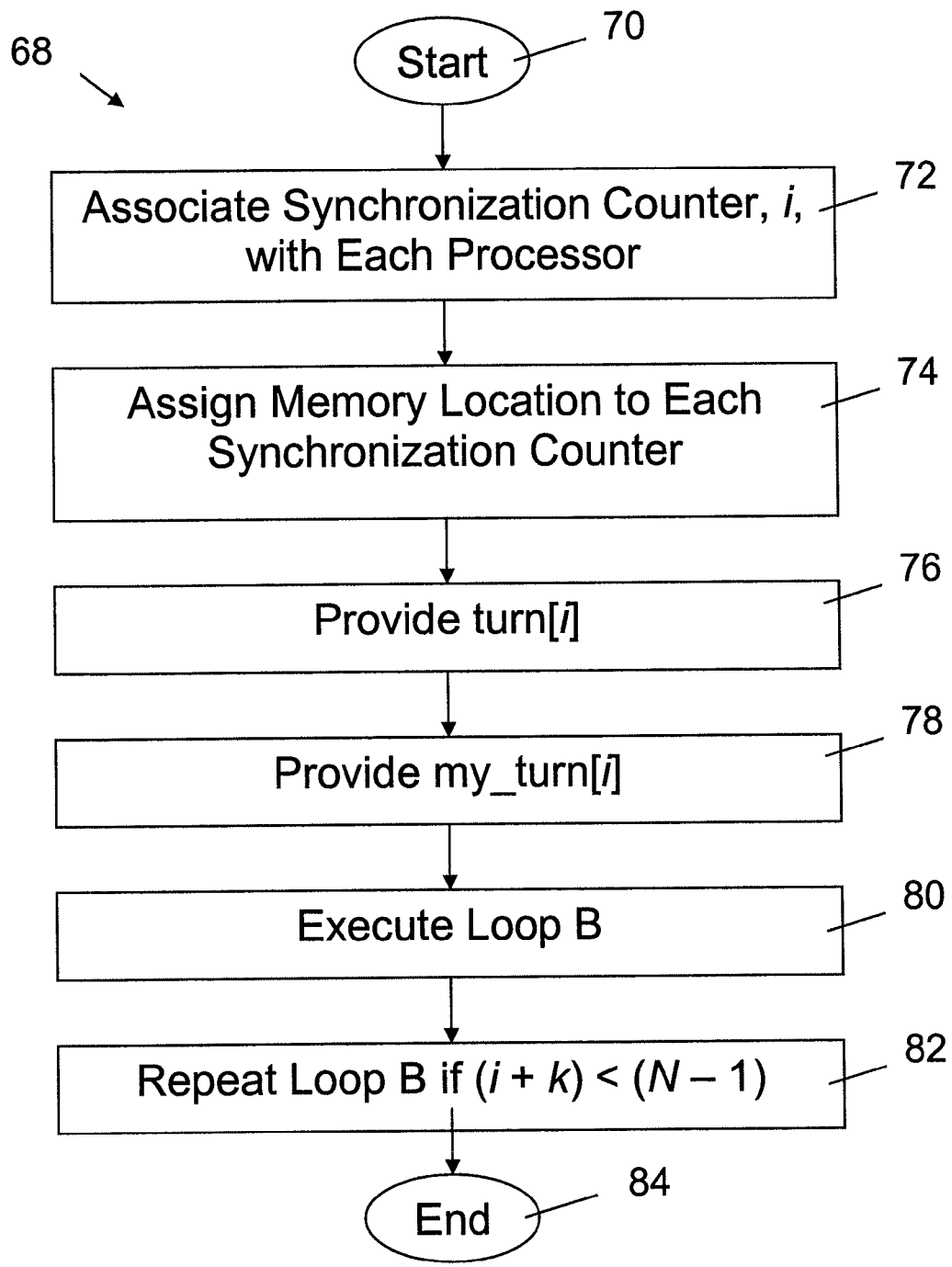
FIG. 5 is a flow chart illustrating a fourth embodiment of the method of the invention.
Figure 6:
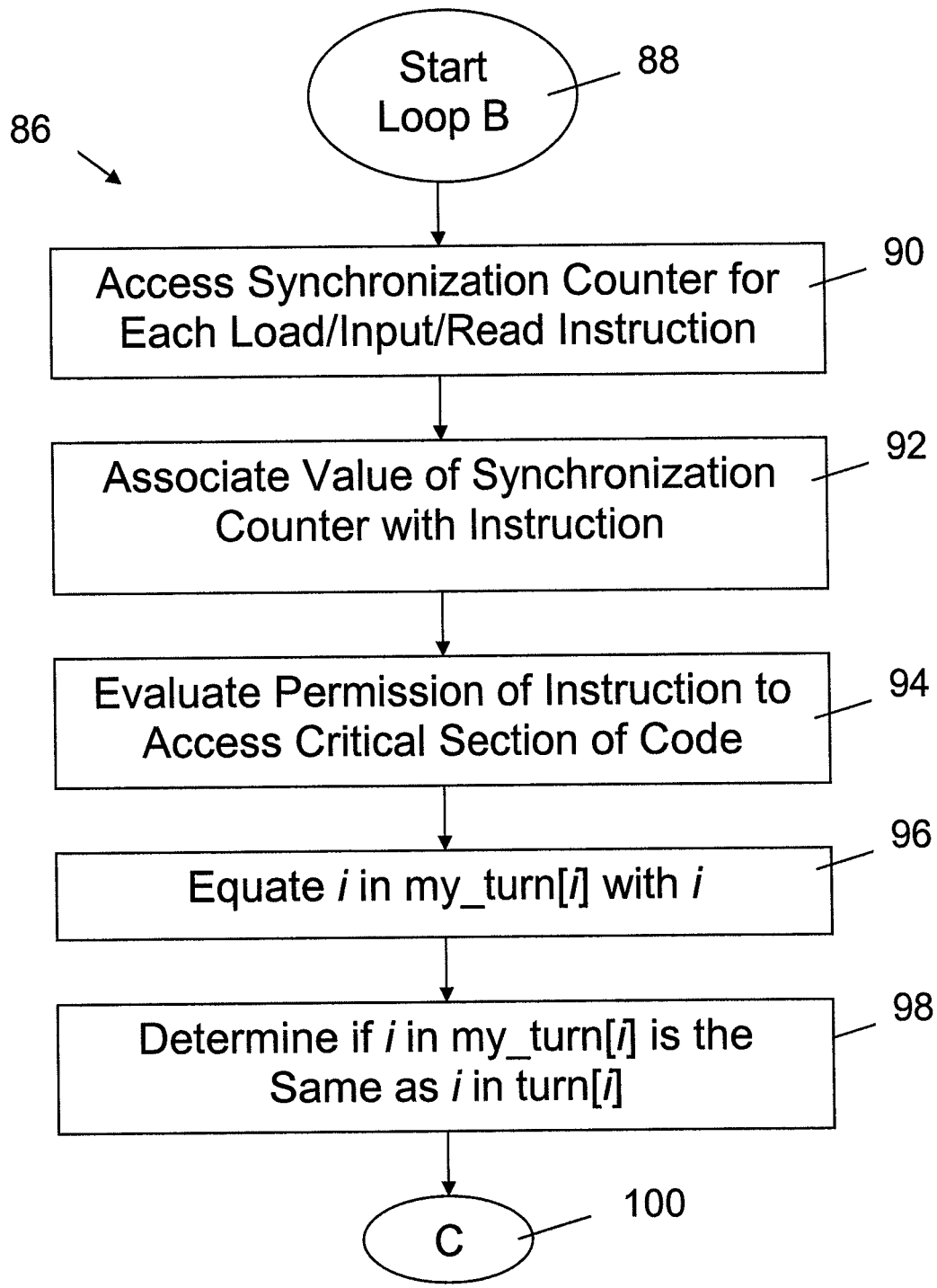
FIG. 6 is a first part of a flow chart illustrating loop B, which is a part of the fourth embodiment of the method illustrated in FIG. 5.
Figure 7:
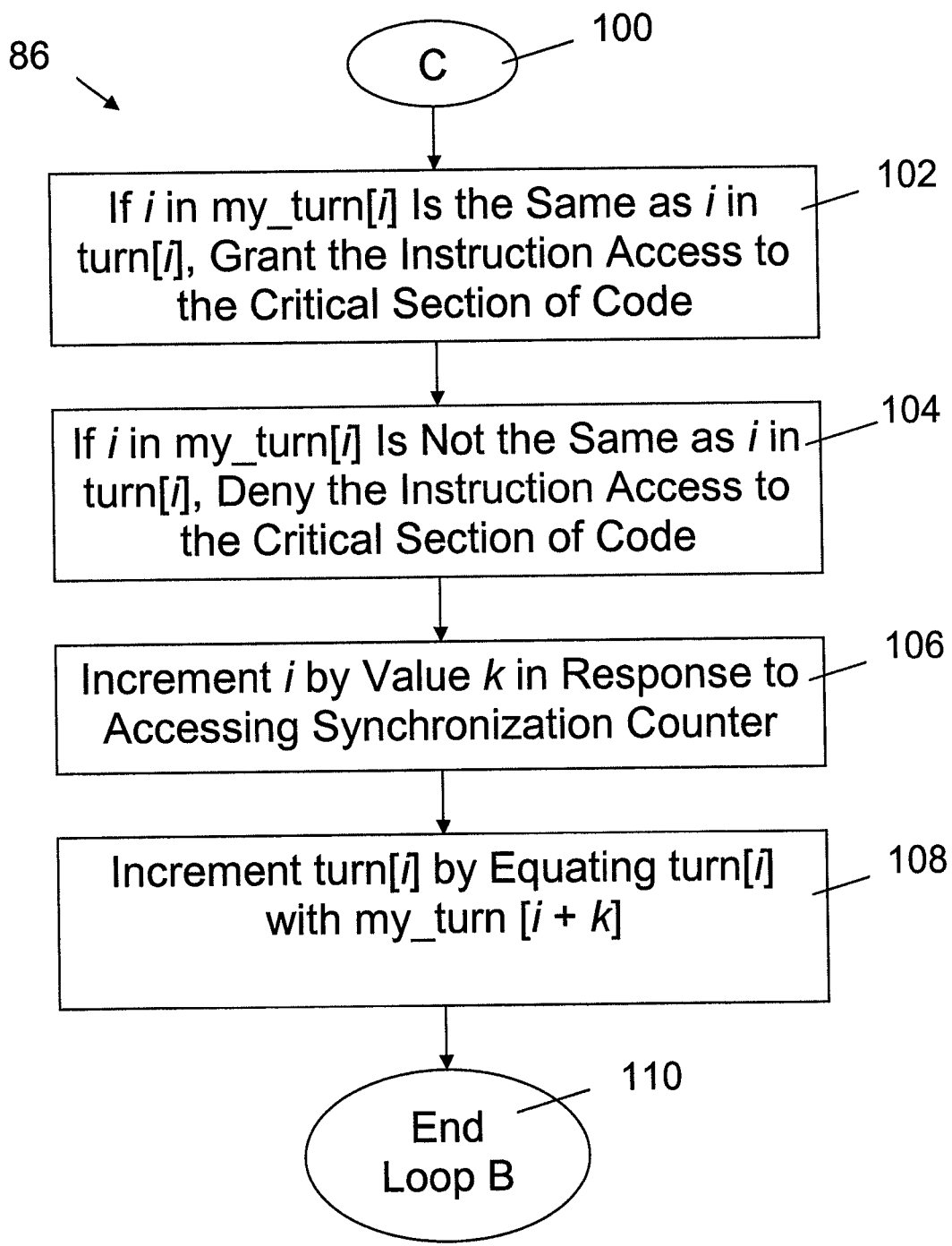
FIG. 7 is a second part of a flow chart illustrating loop B.

Reference is now made to the figures that are a part of the description of the invention. There are four embodiments of the method of the invention that are illustrated in the figures. The first embodiment is illustrated in FIG. 1. The second embodiment is illustrated in FIG. 2. The third embodiment is illustrated in FIGS. 3 and 4. The fourth embodiment is illustrated in FIGS. 5-7. As noted herein, these methods are merely exemplary of the scope of the invention.

As noted above, the present invention is intended to be applied to processing environments that include several processors. Each processor is intended to execute at least one mutex. To facilitate execution of instructions by each processor, a synchronization counter is provided for each processor.

Referring now to FIG. 1, the first embodiment of the method of the invention is described. In this first embodiment, the method 10 provides at least one sequence of values to a plurality of processors. The method 10 begins at 12. At 14, the method associates a sequence generator with memory location. The sequence generator is from one or more sequence generators and is configured to generate the sequence of values. Then, at 16, the method 10 enables one or more read accesses to the memory location by a processor. The processor is one from a plurality of processors. At 18, in response to enabling the read access, the method executes the sequence generator to return a first value from the sequence of values to the processor. At 20, after executing the sequence generator, the method 10 advances the sequence generator so that the subsequent read access generates a second value. This second value is sequentially subsequent to the first value. At 22, the method 10 ends.

With respect to the sequence generator is an N-bit counter, the sequence of values, the sequence encompasses values in the following set: $\{0, 1, \ldots, 2^{N-1}, 0, 1, \ldots, 2^{N-1}, \ldots\}$. As should be apparent, N is an integer. It is intended in this variation of the method 10 that the sequence of values be sequentially incremented from 0 to a $2^{N-1}$. In other contemplated variations, other sequences may be employed without departing from the scope of the invention.

The method 10 may be further varied by enabling a write access to the memory location to store a write value. In response to enabling the write access, the method 10 reconfigures the sequence generator to advance from a different value based on the write value. It is contemplated that the sequence generator may advance from the write value as well. If this variation is employed, a read access after the write access may return the write value. In another variation, a read access after the write access may return a value sequentially subsequent to the write value.

Referring to FIG. 2, the second embodiment of the method of the invention is illustrated. The method 24 begins at 26. At 28, the method 24 proceeds to associate a sequence generator with each mutex from generating a sequence starting with a first value. It is contemplated that the mutex will be one of a plurality of mutexes and that the sequence of values will be one of a plurality of sequences. At 30, a turn indicator is associated with each mutex. In one contemplated variation, the first value of the turn indicator is initialized to the first value from the sequence of values. At 32, when entering a critical section of the code associated with the mutex, the method 24 accesses the sequence generator to read a second value from the sequence of values. At 34, which is also a part of the method 24, when entering a critical section of the code, the method waits until the turn indicator equals the second value before accessing the critical section of the code. At 36, when exiting the critical section of the code, the method 24 sets the turn indicator to a third value subsequent to the second value. The method ends at 38.

Concerning the method 24, there are a number of variations that are contemplated to fall within the scope of the invention. For example, the turn indicator may include several turn indicators. If so, when entering the critical section of code, the method 24 waits on at least one of the several turn indicators. When exiting the critical section of code, all of the turn indicators are set to the third value in the sequence of values. In this variation, it is contemplated that the number of the turn indicators equals the number of the processors. Moreover, the first value is contemplated to be equal to 0.

In another variation of the method 24, the second value is contemplated to be greater than the first value by an integer equal to or greater than 1. Moreover, as discussed, the second value may be less or equal to an integer, N. If the second value is equal to or greater than N, the second value is restarted to the first value. As should be apparent, when the second value is equal to or greater than N, the second value may be restarted to 0. Moreover, in one embodiment, it is contemplated that the second value will be greater than the first value by 1. Of course, as mentioned, the second value may be greater than 1, depending upon the specific implementation of the method 24.

Consistent with this approach, it is contemplated that the turn indicator that a processor accesses is located in memory positions local to the processor. Moreover, it is contemplated that each of the plurality of processors will be initialized simultaneously, although this is not required to practice each contemplated embodiment of the invention. Also, as may be appreciated by those skilled in the art, each of the processors may operate disjunctively after initialization.

In still other contemplated embodiments of the invention, all of the processors may share common operating attributes. Alternatively, one or more of the processors may have operating attributes that differ from operating attributes of others of the processors. While not required to practice the invention, the processors may operate in parallel. In addition, in at least one contemplated embodiment, the synchronization generator and the turn indicator may have the same bit width, as discussed above.

FIG. 3 illustrates a third embodiment of the method of the invention. In this figure, the method 40 is provided specifically in connection with a plurality of processors and a plurality of mutexes, thereby encompassing at least one specific application of the invention. The method 40 begins at 42. Following 42, the method 40 proceeds to 44 where a synchronization counter is associated with each processor. In the method 40, the synchronization counters may be the same as the synchronization generator as discussed in connection with the method 10. Each of the synchronization counters is a variable i, where $i \in \{0 \ldots N-1\}$. N is an integer. Therefore, as may be appreciated by those skilled in the art, i encompasses a range of N integer values. So that the synchronization counters, i, are readily accessible by each processor, the synchronization counters are each assigned different memory locations at 46. Following 46, Loop A is executed at 48. Loop A is discussed below in connection with FIG. 4. After Loop A is executed, the method 40 proceeds to 50, where Loop A is repeated if (i+k)<(N-1).

Loop A, which is illustrated in FIG. 4, has been provided with reference numeral 54. Loop A begins at 56. Then, at 58, the synchronization counter, i, is accessed in response to at least one of a load, a read, or an input instruction. While other instructions may be executed as a part of Loop A, if these other instructions do not involve the critical section of code, these other instructions will not access the synchronization counter.

Loop A then proceeds to 60 where the value of the synchronization counter, i, is associated with an instruction. At 62, an assessment is made if the instruction will be permitted access to a critical section of code. This assessment may be made according to any of a number of different methodologies, as should be appreciated by those skilled in the art. However, for the invention, the assessment is based at least in part upon the value of the synchronization counter associated with the particular instruction. After the assessment at 62, Loop A proceeds to 64, where the synchronization counter, i, is incremented in response to being accessed. The synchronization counter is incremented by a value k, where $k \in \{0 \ldots N-1\}$. Loop A then ends at 66.

FIG. 5 illustrates the fourth embodiment of the method of the invention. While some of the features of the third embodiment are repeated for the fourth embodiment, these features are provided with different identifying reference numerals for ease of this discussion.

The method 68 begins at 70. At 72, the method 68 proceeds to associate the synchronization counter, i, with each processor, just as in the method 40. Then, at 74, a different memory location is associated with each of the synchronization counters. In the method 68, a turn[i] is provided at 76. Turn[i] is a variable that is used to grant the instruction access to a critical section of code. At 78, my_turn[i] is provided. My_turn[i] is a variable that identifies others of the instructions requesting access to the critical section of code. At 80, the method 68 proceeds to execute Loop B, which is discussed below in connection with FIGS. 6 and 7. After Loop B is completed, the method 68 proceeds to 82 where an assessment is made if Loop B should be repeated. As with the method 40, Loop B is repeated if (i+k)<(N−1).

Loop B is now described in connection with FIGS. 6 and 7. Loop B, which is designated by reference numeral 86, begins at 88. From 88, Loop B proceeds to 90, where the synchronization counter is accessed for any of a load, an input, or a read instruction. Loop B then proceeds to 92, where a value of the synchronization counter is associated with the instruction. Then, Loop B evaluates permission of the instruction to access a critical section of the code. As a part of this evaluation, at 96, i in my_turn[i] is equated with i. Then, at 98, a determination is made if i in my_turn[i] is the same as i in turn [i]. The reference numeral 100 indicates that Loop B continues in FIG. 7.

Reference is now made to FIG. 7. At 102, if i in my_turn[i] is the same as the i in turn[i], the instruction will be granted access to the critical section of the code. On the other hand, as indicated at 104, if i in my_turn[i] is not the same i as the i in turn[i], the instruction will be denied access to the critical section of the code. As noted above, this is the beginning of a wait period for those instructions (or threads) requiring access to the code while an earlier instruction is accessing the critical section of the code. At 106, Loop B proceeds to increment i by the value k, as in the previous embodiment. In this loop, however, there is an additional step, at 108, where turn[i] is incremented by equating turn[i] with my_turn[i+k]. Loop B then ends at 110.

With respect to the method 68, i, turn[i], and my_turn[i] all may be initialized to a predetermined initialization value. In one contemplated embodiment, the predetermined initialization value is 0.

As may be appreciated by those skilled in the art, for either of the methods 40 and 68, k may equal 1. Of course, other values may also be used. For either of the methods, Loops A and B may be repeated until i≧N−1.

As noted, for each of the plurality of processors, the synchronization counter, turn[i], and my_turn[i] are located in memory positions that are local to the associated processor. This increases the efficiencies of the respective processors.

With respect to the various embodiments described herein, it is possible to implement mutual exclusion between different processors using the synchronization counters. To do this, a "lock" may be implemented for the synchronization counters. A "lock" is associated with a particular synchronization counter address and a turn variable. To acquire a "lock", the process reads the counter and waits until turn reaches that counter value. Once process finishes, the process increments turn, as discussed. In pseudo-code, this operation is described as follows, as set forth below in Code Segment #3. It is noted that Code Segment #3 is a simplified expression of Code Segment #2, above.

Code Segment #3

```
my = *counter // read the counter
loop while( turn != my ) // wait for it
critical section
turn = my+1;
```

As is apparent from Code Segment #3, and as should be appreciated by those skilled in the art, a lock is most easily implemented in a situation where there is no contention between the different synchronization counters. As can be seen, in the no-contention case, acquiring the lock needs exactly two (2) long latency loads. The first long latency load occurs when the synchronization counters read information. The second long latency occurs when the determination is made if it is the turn of the process.

A difficulty may be presented when circumstances arise where it is possible that, if there is contention and the lock is a spin-lock, the process may repeatedly try to access the remote memory. If this occurs, it is possible that the process may incur long latencies to access the turn variable. This would, of course, result in higher memory traffic that will slow execution of the process.

A system-on-chip ("SoC") is typically a NUMA architecture, where each processor has some local memory that it can access with low latency. Therefore, in a preferred situation, it is desirable to have the turn variable in local memory, as discussed. This can be accomplished by keeping a copy of turn in each processors local memory. The pseudo-code for this approach is provided in Code Segment #4, below.

Code Segment #4

```
my = *counter // read the counter
loop while( turn[i] != my ) // local copy
critical section
for j = 1 to N do
   turn[j] = my+1; // update all copies
end
```

In Code Segment #4, the variable, i, refers to the processor that attempts to enter the critical section. Unfortunately, in a SoC system, generally the memory ordering is such that stores from different processors may execute in any order. Consequently, it is unlikely, but possible, that processor, j, will complete a critical section and will write M to turn[i]. Then, the processor, k, may complete its access of the critical section, writing M+1 to turn[i]. However, when processor, k, access the critical section, the processor's stores may be written in the opposite order to those of the processor, j, so that turn[i] receives final value M. This, as should be apparent to those skilled in the art, may lead to a dead-lock.

The way around this problem is to keep a local copy of turn with a slot for each processor. When updating each copy of a turn, a processor is intended to write to its own slot. All copies of turn indicator are then updated. This update may occur simultaneously. In that case, the pseudo-code is expressed as shown below in Code Segment #5.

```
                    Code Segment #5 my = *counter  // read the counter
    loop while( turn[i][1] != my
         and turn[i][2] != my
         ...
         and turn[i][N] != my )
    critical section
    for j = 1 to N do
       turn[j][i] = my+1;  // update all copies
    end
```

With this approach, it is expected that only one long latency load is required to acquire the lock. This allows the process to acquire an uncontested lock in less than 100 ns, in many circumstances. As should be apparent to those skilled in the art, this approach also has other advantages that are not discussed herein.

There are numerous equivalents and variations of the invention that should be appreciated by those skilled in the art that are not described herein. It is intended that the invention encompass those equivalents and variations. The invention is not intended to be limited solely to the embodiments described herein.

What is claimed is:

1. A method executed by a plurality of processors for a plurality of mutexes, comprising:
    associating a sequence generator with each mutex, each sequence generator being adapted to generate a value for each of the processors from a sequence of values, starting from a first value;
    associating a turn indicator with each mutex, wherein a first value of the turn indicator is initialized to the first value from the sequence of values;
    when entering a section of code associated with the mutex, accessing the associated sequence generator to read a second value from the sequence of values, and waiting until the associated turn indicator equals the said second value from the sequence of values before accessing the section of code; and
    when exiting the section of code, setting the turn indicator to a third value subsequent to the second value in the sequence of values.

2. The method of claim 1, wherein the turn indicator comprises a plurality of turn indicators, the method further comprising:
    when entering the section of code, waiting until at least one of the plurality of turn indicators equals the said second value from the sequence of values before accessing the section of code; and
    when exiting the section of code, setting all of the plurality of turn indicators to the third value in the sequence of values.

3. The method of claim 2, wherein associating the plurality of turn indicators comprises associating a number of turn indicators equal to the number of the processors.

4. The method of claim 3, wherein associating a sequence generator comprises setting the first value of the sequence generator to 0.

5. The method of claim 2, wherein accessing the turn indicator comprises accessing a turn indicator for a mutex for a processor, the turn indicator located in memory positions local to the processor.

6. The method of claim 2, wherein the synchronization generator and the turn indicator have the same bit width.

7. The method of claim of claim 2, wherein all of the plurality of turn indicators are set to the third value simultaneously.

8. The method of claim 1, wherein accessing the associated sequence generator to read a second value comprises:
    generating the second value greater than the first value by an integer equal to or greater than 1, and
    if the second value is equal to or greater than an integer, N, the second value is restarted to the first value.

9. The method of claim 8, wherein:
    if the second value is equal to or greater than N, the second value is restarted to 0.

10. The method of claim 9, wherein:
    the second value is greater than the first value by 1.

11. The method of claim 1, wherein the plurality of processors are initialized simultaneously.

12. The method of claim 11, wherein the plurality of processors operate disjunctively after initialization.

13. The method of claim 1, wherein the plurality of processors share common operating attributes.

14. The method of claim 1, wherein one of the plurality of processors has operating attributes that differ from operating attributes of another of the plurality of processors.

15. The method of claim 1, wherein the plurality of processors operate in parallel.

16. A computer readable, non-transitory medium having computer readable program code embodied therein for processing a plurality of mutexes for a plurality of processors, the program code, when executed, causing the processor to:
    associate a sequence generator with each mutex, each sequence generator being adapted to generate a value for each of the processors from a sequence of values, starting from a first value;
    associate a turn indicator with each mutex, wherein a first value of the turn indicator is initialized to the first value from the sequence of values;
    when entering a section of code associated with the mutex, access the associated sequence generator to read a second value from the sequence of values, and wait until the associated turn indicator equals the said second value from the sequence of values before accessing the section of code; and
    when exiting the section of code, set the turn indicator to a third value subsequent to the second value in the sequence of values.

17. The computer readable, non-transitory medium of claim 16, wherein the turn indicator comprises a plurality of turn indicators, the program code, when executed, further causing the processor to:
    when entering the section of code, waiting until at least one of the plurality of turn indicators equals the said second value from the sequence of values before accessing the section of code; and
    when exiting the section of code, set all of the plurality of turn indicators to the third value in the sequence of values.

18. The computer readable, non-transitory medium of claim 17, wherein associating a turn indicator comprises associating a number of turn indicators equals the number of the processors.

19. The computer readable, non-transitory medium of claim 16, wherein the plurality of processors share common operating attributes.

20. The computer readable, non-transitory medium of claim 16, wherein one of the plurality of processors has operating attributes that differ from operating attributes of another of the plurality of processors.

* * * * *